(12) United States Patent
Kim et al.

(10) Patent No.: US 10,580,560 B2
(45) Date of Patent: Mar. 3, 2020

(54) COIL MODULE

(71) Applicant: WITS Co., Ltd., Yongin-si, Gyeonggi-do (KR)

(72) Inventors: Hee Seung Kim, Suwon-si (KR); Ki Won Chang, Suwon-si (KR); Chang Hee Lee, Suwon-si (KR); Jae Sun Won, Suwon-si (KR); Hyo Jung Yoon, Suwon-si (KR); Gie Hyoun Kweon, Suwon-si (KR)

(73) Assignee: WITS Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/793,091

(22) Filed: Oct. 25, 2017

(65) Prior Publication Data

US 2018/0182526 A1    Jun. 28, 2018

(30) Foreign Application Priority Data

Dec. 28, 2016   (KR) ........................ 10-2016-0181235
Apr. 27, 2017   (KR) ........................ 10-2017-0054437

(51) Int. Cl.
| | |
|---|---|
| *H01F 17/04* | (2006.01) |
| *H01F 38/14* | (2006.01) |
| *G06K 19/07* | (2006.01) |
| *G06K 19/06* | (2006.01) |
| *H01F 27/30* | (2006.01) |

(52) U.S. Cl.
CPC ....... *H01F 17/04* (2013.01); *G06K 19/06206* (2013.01); *G06K 19/0727* (2013.01); *H01F 38/14* (2013.01); *H01F 27/306* (2013.01); *H01F 2038/143* (2013.01)

(58) Field of Classification Search
CPC ........ H01F 17/04; H01F 38/14; H01F 27/306; G06K 19/0727; G06K 19/06206; H02J 50/10; H04B 5/0087

See application file for complete search history.

(56) References Cited

U.S. PATENT DOCUMENTS

| | | | |
|---|---|---|---|
| 2002/0177409 A1* | 11/2002 | Raggam | H04B 5/0087 455/41.1 |
| 2014/0232330 A1* | 8/2014 | Robertson | H01M 2/1022 320/108 |
| 2015/0084972 A1 | 3/2015 | Wu et al. | |

(Continued)

FOREIGN PATENT DOCUMENTS

| | | |
|---|---|---|
| CN | 2847386 Y | 12/2006 |
| CN | 102063999 A | 5/2011 |

(Continued)

OTHER PUBLICATIONS

Chinese Office Action dated Jan. 14, 2020 issued in corresponding Chinese Patent Application No. 201711446078.6.

*Primary Examiner* — Thanh C Le
(74) *Attorney, Agent, or Firm* — Harness, Dickey & Pierce, P.L.C.

(57) ABSTRACT

A coil module including a magnetic body having a first body portion extended in a first axial direction and a second body portion extended in a second axial direction different from the first axial direction; and a transmitting coil including a first coil wound around a portion of the first body portion and a second coil wound around a portion of the second body portion.

14 Claims, 18 Drawing Sheets
(2 of 18 Drawing Sheet(s) Filed in Color)

(56) References Cited

U.S. PATENT DOCUMENTS

| | | | |
|---|---|---|---|
| 2016/0189848 A1* | 6/2016 | Nam | H01F 38/14 |
| | | | 307/104 |
| 2016/0211702 A1* | 7/2016 | Muratov | H02J 50/10 |
| 2016/0261026 A1* | 9/2016 | Han | H04B 1/3888 |

FOREIGN PATENT DOCUMENTS

| | | |
|---|---|---|
| EP | 1953865 A1 | 8/2008 |
| KR | 10-2006-0107143 A | 10/2006 |
| KR | 10-2013-0134726 A | 12/2013 |
| KR | 10-2016-0062083 A | 6/2016 |

* cited by examiner

COIL MODULE

CROSS-REFERENCE TO RELATED APPLICATION(S)

This application claims benefit under 35 USC 119(a) of Korean Patent Application Nos. 10-2016-0181235 filed on Dec. 28, 2016 and 10-2017-0054437 filed on Apr. 27, 2017 in the Korean Intellectual Property Office, the entire disclosure of which is incorporated herein by reference for all purposes.

BACKGROUND

1. Field

The present disclosure relates to a coil module.

2. Description of Related Art

Wireless communications using a coil have been applied to use in various environments. In particular, wireless communications technology using such a coil is applied in connection with electronic approval of certain transactions.

In such a wireless communications technology, a receiving coil is magnetically coupled to a magnetic field formed by a transmitting coil in such a manner that data is transmitted therebetween. Accordingly, reliability of the data transmission is determinable based on the degree of magnetic coupling between the transmitting coil and the receiving coil.

Wireless communications technology implementing the coil may be applied to various applications, and angles or positions of the transmitting coil and the receiving coil may be changed depending on the embodiment. As a result of potential mismatch, misalignment, or distance, or other such factors between the transmitting coil and the receiving coil, reliability of data transmission is not ideal and is often substantially degraded.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a coil module, includes: a magnetic body including a first body portion extended in a first axial direction and a second body portion extended in a second axial direction different from the first axial direction; and a transmitting coil comprising a first coil wound around a portion of the first body portion and a second coil wound around a portion of the second body portion.

The first coil may be connected to the second coil in parallel, and the first coil may be operated together with the second coil.

The first body portion may be separated from and spaced apart from the second body portion.

A winding angle of the first coil with respect to the first axial direction may correspond to a winding angle of the second coil with respect to the second axial direction.

A winding angle of the first coil with respect to the first axial direction may be different from a winding angle of the second coil with respect to the second axial direction.

A difference between the first axial direction and the second axial direction may be a first angle. A difference between the winding angle of the first coil with respect to the first axial direction and the winding angle of the second coil with respect to the second axial direction may be a second angle. The first angle and the second angle may be different from each other.

The transmitting coil may further include: a third coil wound around at least a portion of the second body portion; and a winding angle of the second coil with respect to the second axial direction and a winding angle of the third coil with respect to the second axial direction being different from each other.

The magnetic body may further include: a third body portion extended in a direction of a third axial direction which is different from at least one of the first axial direction and the second axial direction; and the transmitting coil further comprises a third coil wound around a portion of the third body portion.

The magnetic body may further include: a third body portion extended in the direction of the first axial direction; and the transmitting coil further comprises a third coil wound around a portion of the third body portion.

In another general aspect, a coil module includes: a magnetic body comprising a first body portion and a second body portion, the first body portion extending in a first axial direction and having a symmetrical polygonal shape, and the second body portion having an asymmetrical polygonal shape; and a transmitting coil including a first coil wound around at least a portion of the first body portion and a second coil wound around at least a portion of the second body portion.

A winding angle of the first coil with respect to the first axial direction may be different from a winding angle of the second coil with respect to the first axial direction.

The magnetic body may further include a third body portion formed at one side of the second body portion and having the symmetrical polygonal shape, and the transmitting coil further includes a third coil wound around a portion of the third body portion.

In another general aspect, a coil module, includes: a magnetic body extended in a first axial direction; and a transmitting coil comprising a first coil wound around a first portion of the magnetic body and a second coil wound around a second portion of the magnetic body. The first coil is wound at a first angle with respect to the first axial direction, and the second coil is wound at a second angle different from the first angle, with respect to the first axial direction.

The transmitting coil may further include a third coil wound around a third portion of the magnetic body at a third angle different from the second angle, with respect to the first axial direction.

A spaced region may be formed between the first coil and the second coil.

The magnetic body may comprise: a first body part extended in the first axial direction; and a second body part extended in a second axial direction different from the first axial direction, and separated from and spaced apart from the first body part.

The first coil may be wound around the first body part, and the second coil is wound around the second body part.

The magnetic body may include: a first body part extended in the first axial direction and having a symmetrical polygonal shape; and a second body part having one end connected to one end of the first body part and having an asymmetrical polygonal shape.

The first coil may be wound around the first body part, and the second coil may be wound around the second body part.

In another general aspect, an information transmitter for transmitting data to magnetic card reader in a non-contact type, includes: a coil module including a magnetic body extended in a first axial direction and a transmitting coil wound around the magnetic body; and a wireless communications unit configured to control the coil module to transmit the data to the magnetic card reader. The transmitting coil includes a first coil wound at a first angle with respect to the first axial direction and a second coil wound at a second angle different to the first angle, with respect to the first axial direction.

Other features and aspects will be apparent from the following detailed description, the drawings, and the claims.

BRIEF DESCRIPTION OF DRAWINGS

The patent or application file contains at least one drawing executed in color. Copies of this patent or patent application publication with color drawings will be provided by the Office upon request and payment of the necessary fee.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Figure 1:
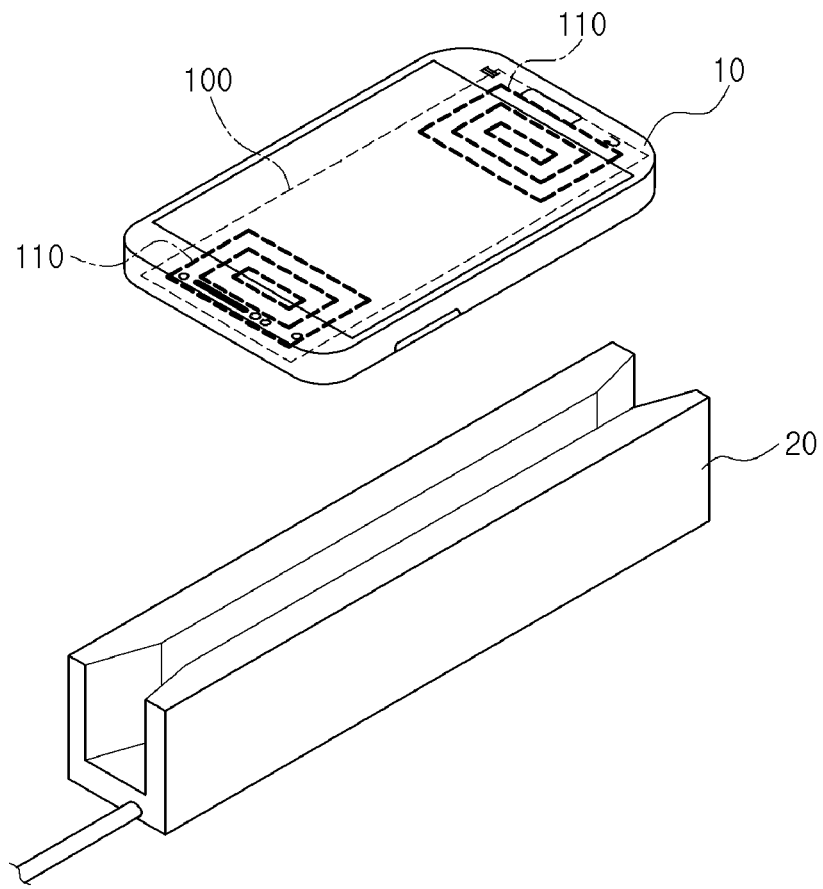
FIG. 1 is a view illustrating an example of a wireless power transmitter application.

FIG. 1 is a perspective view illustrating an example in which a mobile terminal to which a coil for wireless communications is applied performs wireless communications.

An information transmitter 100 is applied to a mobile terminal 10. According to the example, the information transmitter 100 is the mobile terminal 10 itself but may also be a partial configuration of the mobile terminal 10.

The information transmitter 100 includes a coil module 110, and the coil module 110 forms a magnetic field under the control of the information transmitter 100.

The coil module 110 may be operated as a transmitting coil, and may be magnetically coupled to an information receiver including a receiving coil to wirelessly transmit information.

FIG. 1 illustrates a magnetic card reader 20 as the information receiver including the receiving coil. In other examples, various information receivers may be used as a device including the receiving coil, in addition to the magnetic card reader 20.

The coil module 110 is at least one coil.

In an illustrated example, the coil module 110 includes a plurality of coils, and the plurality of coils forms a magnetic field which is widely spread. Therefore, the coil module 110 increases magnetic coupling performance even in a case where the position or angle of the receiving coil of the magnetic card reader 20 is changed, due to forming a widely spread magnetic field using the plurality of coils.

The coil module 110 may be a solenoid coil. In an illustrated example, the coil module 110 is illustrated to be similar to a spiral coil, but this is for convenience of explanation. The coil module according to examples will be described below with reference to FIGS. 7 through 13.

The information transmitter 100 transmits data to be transmitted to the magnetic card reader 20, e.g., card number data, by changing the direction of a magnetic field. In other words, the magnetic card reader 20 reads the card number data using a change in a voltage across the receiving coil caused by changes in the magnetic field, such as, changing the direction of the magnetic field formed by the coil module 110.

Hereinafter, the magnetic card reader 20 will be described in more detail with reference to FIGS. 2 through 4.

Figure 2:
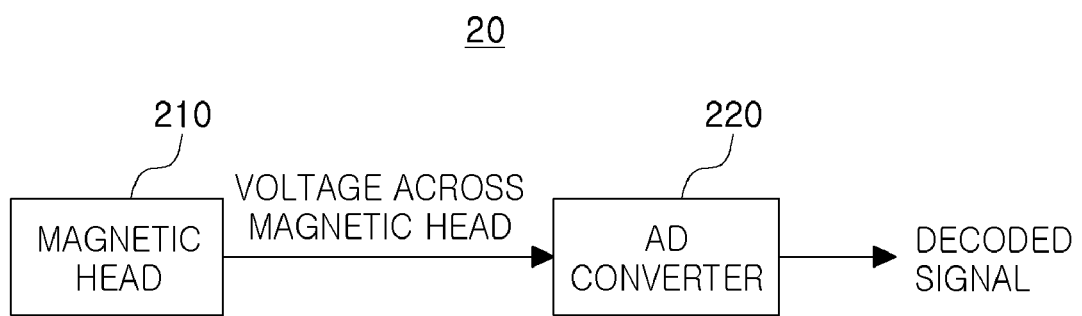
FIG. 2 is a block diagram illustrating an example of a magnetic card reader.

FIG. 2 is a block diagram illustrating the magnetic card reader.

Referring to FIG. 2, the magnetic card reader 20 includes a magnetic head 210 and an analog-digital converter 220.

The magnetic head 210 generates a voltage by subtending magnetic flux. That is, the magnetic head 210 includes a receiving coil, and detects a voltage across the receiving coil generated by the magnetic field.

The analog-digital converter 220 generates a decoded signal from the voltage across the receiving coil. The decoded signal may be, for example, a digital voltage signal, and may generate card information data from the decoded signal.

Figure 3:
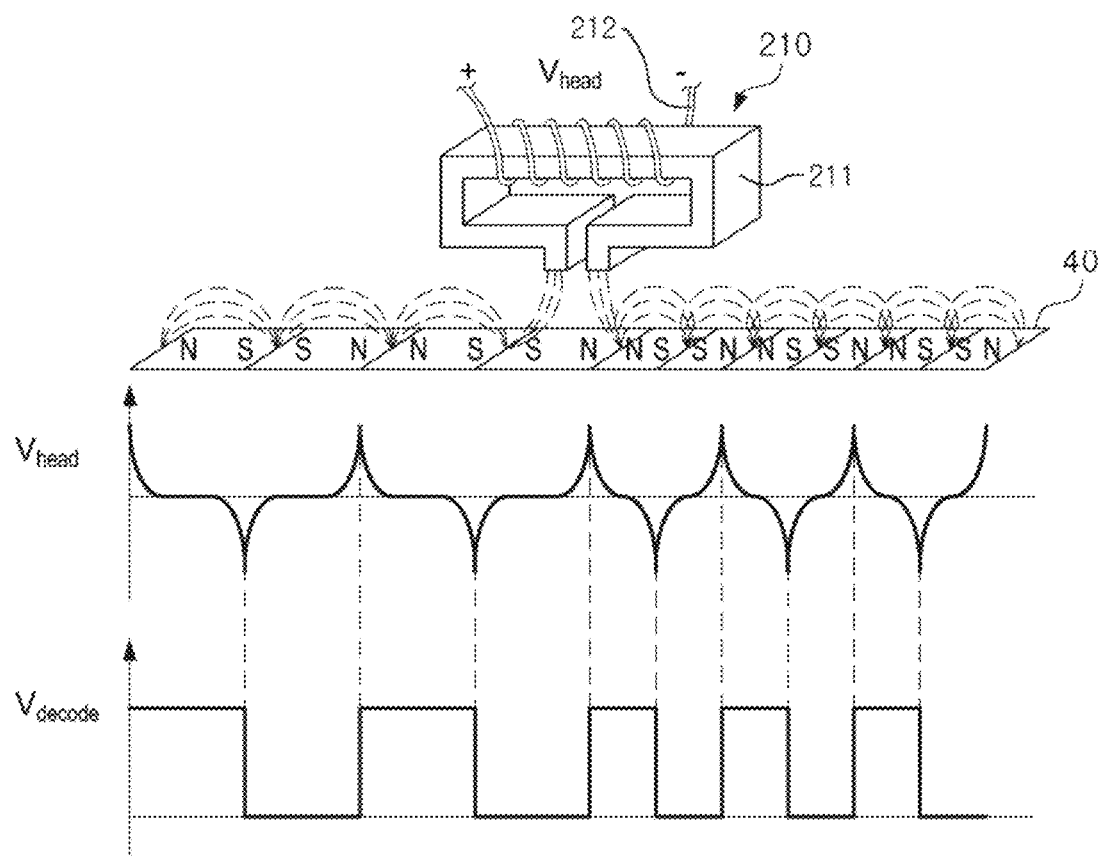
FIG. 3 is a view illustrating an example of a voltage across a magnetic head adjacent to the magnetic card.

FIG. 3 is a view illustrating a voltage across a magnetic head adjacent to the magnetic card.

Referring to FIG. 3, the magnetic head 210 includes a core 211 and a receiving coil 212.

The core 211 may be formed of various materials. In one example, the core 211 is formed of hard permalloy. The core 211 may have, in one or more examples, relative permeability of about 100,000, for example.

The receiving coil 212 is wound around the core 211.

When the receiving coil 212 experiences a change in the magnetic field, a voltage $V_{head}$ across the receiving coil 212 is generated by the magnetic flux. The generated voltage $V_{head}$ across the receiving coil 212 is provided to the analog-digital converter 220 (FIG. 2), and the analog-digital converter generates the decoded signal from the voltage across the receiving coil 212.

The magnetic card has a magnetized magnetic stripe 40. As the magnetic head 210 is moved over the magnetic stripe 40, the voltage $V_{head}$ across the receiving coil of the magnetic head 210 is generated by the magnetic flux.

The voltage $V_{head}$ across the receiving coil has a peak voltage depending on polarities of the magnetic stripe 40. In an illustrated example, it is seen that in a case in which an S polarity and an S polarity are adjacent to each other, a negative peak voltage is generated, and in a case in which an N polarity and an N polarity are adjacent to each other, a positive peak voltage is generated.

The analog-digital converter 220 (illustrated in FIG. 2) generates the decoded signal $V_{decode}$ from the voltage $V_{head}$ across the receiving coil. In one example, the analog-digital converter generates an edge whenever the peak voltage is detected to generate the decoded signal $V_{decode}$.

The decoded signal $V_{decode}$ is a digital voltage signal from which digital data is decoded. For example, depending on the length of a period of the decoded signal $V_{decode}$, a '1' or '0' is decoded. It is seen from the illustrated example that a first period and a second period of the decoded signal $V_{decode}$ are two times of a third period thereof. Therefore, the first period and the second period of the decoded signal $V_{decode}$ are decoded as '1', and the third period to the fifth period are decoded to '0'. Such a decoding method is illustrative, and it should be apparent to one of skill in the art, after gaining a full understanding of the disclosure, that various decoding technologies may be applied.

FIG. 3 illustrates an example in which the magnetic card reader performs the decoding from the magnetic stripe, but the magnetic head 210 may generate the voltage across the magnetic head 210 from the magnetic field generated by the coil module 110 of the information transmitter 100 as well as the magnetic stripe. That is, the magnetic head 210 of the magnetic card reader may be magnetically coupled to the magnetic field form by the information transmitter to receive data—e.g., card number data.

That is, the information transmitter 100 may form the magnetic field to transmit the data, and the magnetic card reader may receive the data—e.g., the card number data—using the magnetic field formed by the information transmitter 100.

Figure 4:
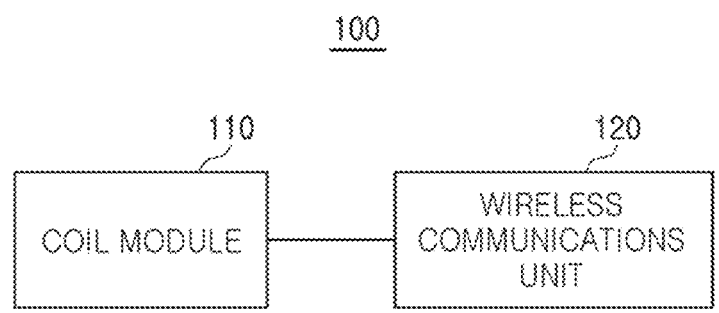
FIG. 4 is a block diagram illustrating an example of an information transmitter in the present disclosure.

FIG. 4 is a block diagram illustrating the information transmitter according to an example in the present disclosure. Hereinafter, the information transmitter 100 will be described in more detail with reference to FIG. 4.

Referring to FIG. 4, the information transmitter 100 includes the coil module 110 and a wireless communications unit 120.

The wireless communications unit 120 wirelessly transmits data to the magnetic card reader 20 (FIG. 2) through the coil module 110.

For example, as illustrated in FIG. 3, the wireless communications unit 120 changes a direction of the magnetic field formed by the coil module 110 by changing a direction of a current applied to the coil module 110. Thereby, the peak value of the head voltage applied to the magnetic head 210 of the magnetic card reader 20 is changed, and the magnetic card reader 20 performs the decoding as described above using the change in the peak value of the head voltage to receive card information transmitted from the wireless communications unit 120.

Since the information transmitter 100 may be applied to various mobile terminals such as a smartphone and a smart watch, it may be important to increase the degree of magnetic coupling with the magnetic card reader 20 in any environment.

Therefore, according to an example, the coil module 110 increases the degree of magnetic coupling with the magnetic card reader 20 by using a solenoid-type coil.

Hereinafter, a comparative example using a general spiral coil and the solenoid-type coil module of the present application will be described in comparison with each other.

Figure 5:
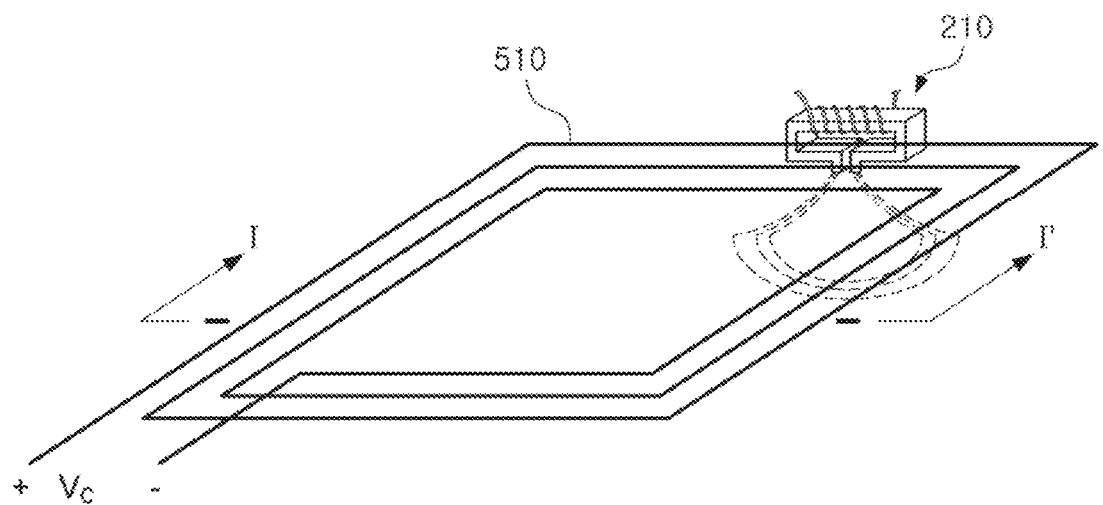
FIG. 5 is a view illustrating an example in which a transmitting coil including a spiral coil and the magnetic head of the magnetic card reader are coupled to each other, as a comparative example.

FIG. 5 is a view illustrating an example in which a transmitting coil including a spiral coil and the magnetic head of the magnetic card reader are coupled to each other, as a comparative example.

A transmitting coil 510 is powered with a voltage Vc to form a magnetic field, and the magnetic head 210 magnetically couples to the magnetic field formed by the transmitting coil 510 to receive data.

As illustrated, in order for the transmitting coil 510 and the magnetic head 210 to magnetically and smoothly couple to each other, the position of the magnetic head 210 is important.

The magnetic head 210 magnetically and smoothly couples to a component of the magnetic field having a specific directionality due to the shape and winding direction of the coil. That is, in an illustrated example, the magnetic head 210 is magnetically and smoothly coupled to the component of the magnetic field of a horizontal direction. It is seen that the magnetic coupling of the magnetic head 210 with the component of the magnetic field is more smoothly formed around a winding of the transmitting coil 510.

Figure 6:
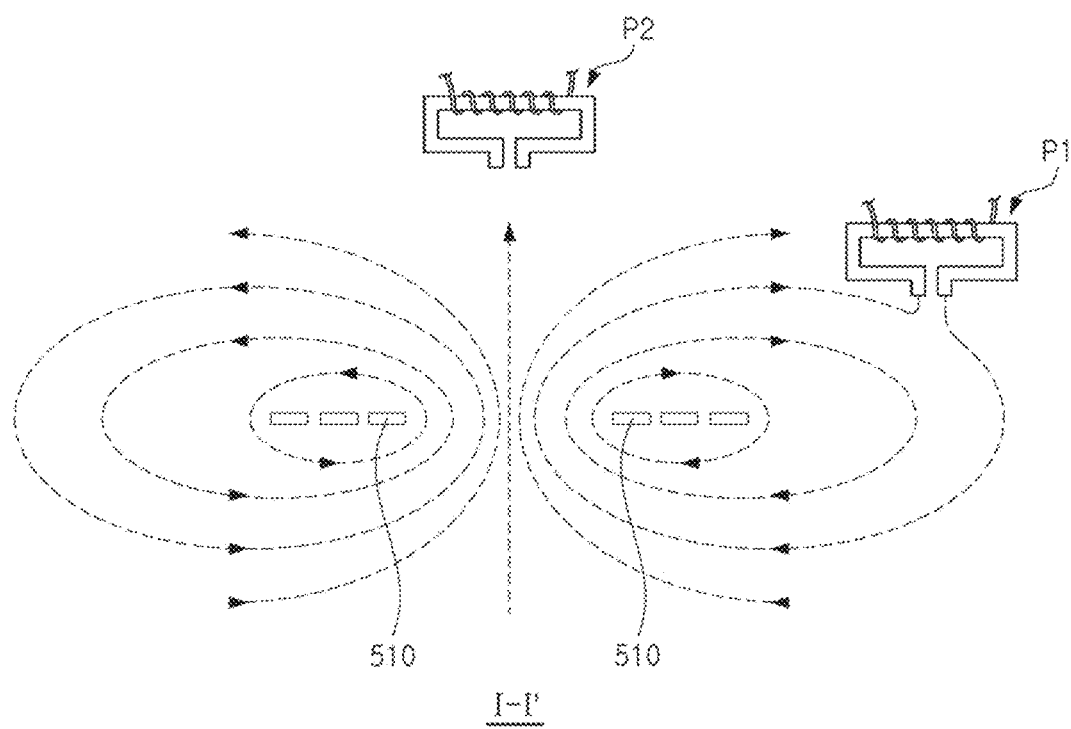
FIG. 6 is a cross-sectional view taken along a direction of I-I' of FIG. 5.

FIG. 6 is a cross-sectional view taken along a direction of I-I' of FIG. 5, and illustrates the magnetic coupling based on the position of the magnetic head in the transmitting coil including one spiral coil.

The transmitting coil 510 forms a magnetic field by a flow of current as illustrated in the example. The direction of the magnetic field changes according to the direction of the current flowing in the transmitting coil 510.

In an example P1 in which the magnetic head is positioned around the transmitting coil, the magnetic coupling between the magnetic head and the transmitting coil is smoothly performed, as illustrated. One of the reasons for the smooth connection is due to the magnetic field being formed by a transmitting coil having a loop shape around the transmitting coil, the magnetic head is magnetically coupled with the magnetic field. In addition, since the magnetic head is smoothly coupled with the magnetic field radiating in the horizontal direction, the magnetic field of the loop shape which is parallel to the magnetic head is formed around the magnetic head in the illustrated example P1. As a result, the magnetic coupling between the magnetic head and the magnetic field is smoothly performed.

Meanwhile, in an example P2 in which the magnetic head is positioned at the center of the transmitting coil 510, the magnetic field having a component which is perpendicular to the magnetic head is formed around the magnetic head as illustrated. Therefore, the magnetic coupling between the magnetic head and the magnetic field may be weak, or there may be no magnetic coupling therebetween.

As a result, in a case in which the transmitting coil comprises a spiral coil, as in the comparative example, magnetic coupling force changes depending upon the position of the magnetic head, i.e., the receiving coil.

In particular, since the transmitting coil comprising only one coil is typically positioned at a central portion of the mobile terminal, the magnetic head of the magnetic card reader is often positioned at a central portion of the transmitting coil. Accordingly, the magnetic coupling between the magnetic head and the magnetic field is decreased, and there is a need to align the magnetic head to couple with the transmitting coil, which may be inconvenient.

In addition, in a case in which a case of the mobile terminal is formed of a metal, since such metal case interrupts the formation of the magnetic field, the magnetic coupling force of the spiral coil decreases.

Figure 7:
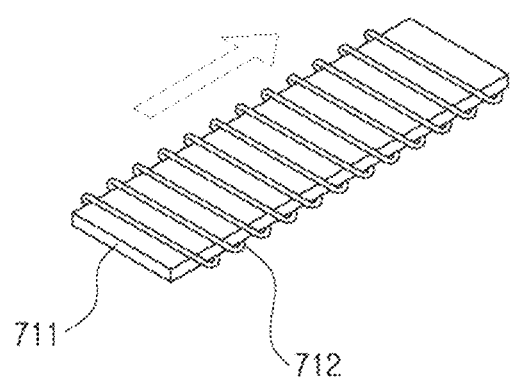
FIG. 7 is a perspective view illustrating an example of a solenoid-type coil module.

FIG. 7 is a perspective view illustrating a solenoid-type coil module.

Referring to FIG. 7, the coil module 110 includes a magnetic body 711 having a linear bar form and a coil 712 wound therearound.

Since the coil module illustrated in FIG. 7 is the solenoid type, magnetic field exits one end of the solenoid and enters the other end. That is, the magnetic field has a component that is parallel to the solenoid such as illustrated arrow in FIG. 7.

Therefore, in a case in which the illustrated coil module is applied to a mobile terminal, since the magnetic field is formed to have a strong directionality that is parallel to a length direction of the mobile terminal, the magnetic field easily makes contact with the magnetic head of the magnetic card reader in the overall region of the mobile terminal.

Even in a case in which the mobile terminal includes a metal case, since the magnetic field formed by the coil module 110 is formed to accommodate the metal case, interruption caused by the metal case is minimal.

However, the illustrated coil module described above has magnetic field having high directionality with respect to a specific one direction.

As described above, since the magnetic head of the magnetic card reader also has directionality in a specific direction, the recognition range or the recognition probability may be differently set depending upon a relationship between the directionality of the coil module illustrated in FIG. 7 and the directionality of the magnetic head of the magnetic card reader.

Figure 8A:
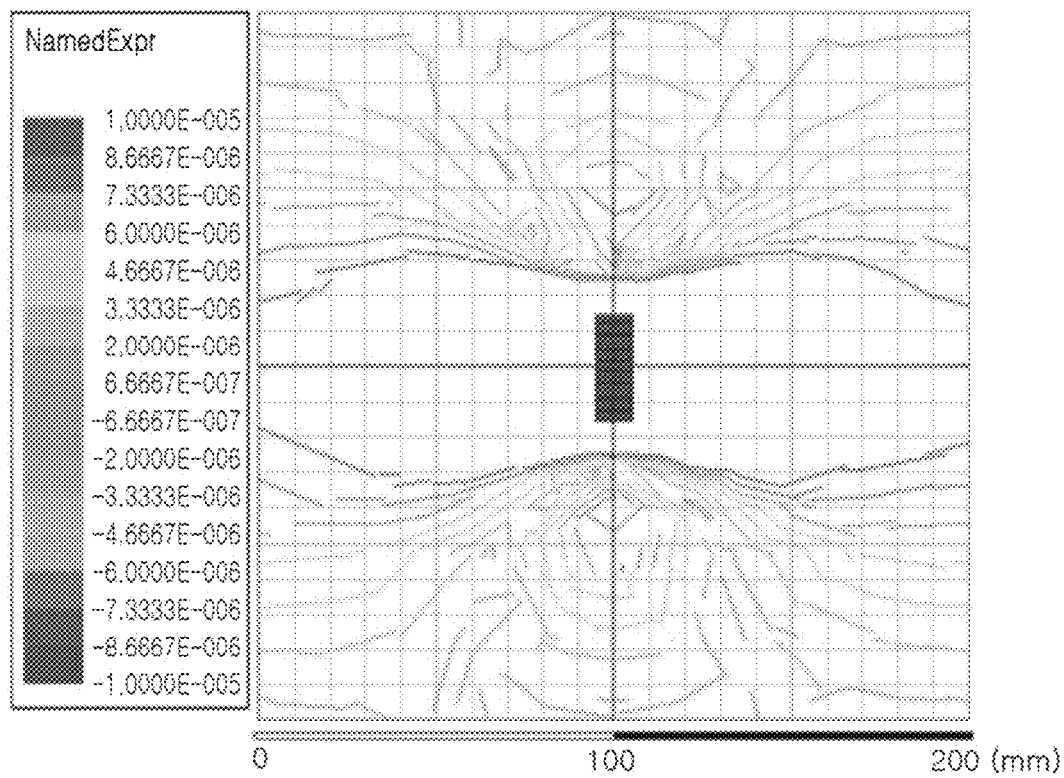
FIGS. 8A and 8B are graphs illustrating a recognition range of the coil module illustrated in FIG. 7.
Figure 8B:
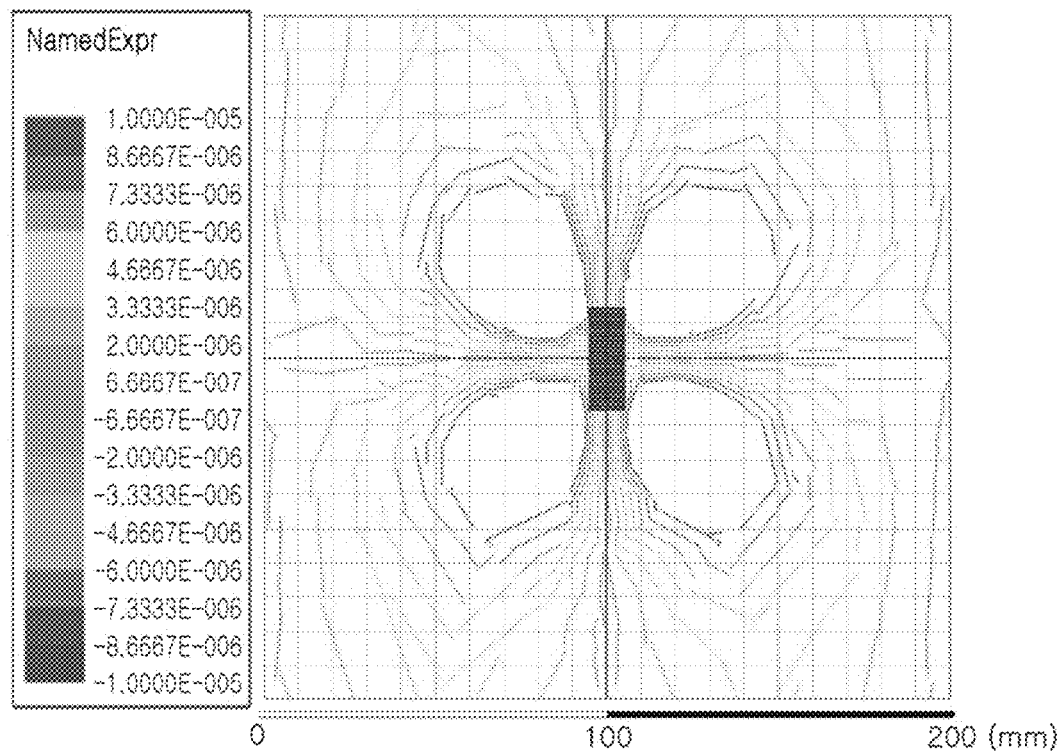

FIGS. 8A and 8B are graphs illustrating a recognition range of the coil module illustrated in FIG. 7, and a description will be provided with reference to FIGS. 8A and 8B.

FIG. 8A illustrates a recognition range of a case in which the direction of the magnetic head of the magnetic card reader is in a vertical direction.

The coil module, which is the solenoid type, forms a magnetic field having strong directionality in the lengthwise direction of the solenoid, that is, the vertical direction as illustrated in the example. Therefore, as illustrated in FIG. 8A, it is seen that the magnetic coupling between the magnetic head and the magnetic field are smoothly performed in a plurality of regions in which the magnetic head is parallel to the coil module.

FIG. 8B illustrates a recognition range of a case in which the direction of the magnetic head of the magnetic card reader is in a horizontal direction.

Similarly, the coil module, which is the solenoid type, forms a magnetic field while having strong directionality in the lengthwise direction of the solenoid, that is, the vertical direction in an illustrated example. Therefore, as illustrated in FIG. 8B, the magnetic head is magnetically and smoothly coupled to only some portions of the magnetic field generated by the solenoid coil module that has horizontal directionality, that is, corner portions of both ends of the magnetic field.

As a result, as illustrated in FIGS. 8A and 8B, the illustrated coil module forms a plurality of magnetic fields having strong directionality in a specific direction, that is, a length direction in a linear bar form. Therefore, it is seen that a wider recognition range is provided in a case where the directionality of the magnetic head corresponds to the directionality of the coil module, but the recognition range becomes narrower when the directionality of the magnetic head and the directionality of the coil module are different from each other.

One of the reasons is due to the solenoid-type coil module having strong directionality in only a specific direction.

Therefore, according to the example, a solenoid-type coil module is capable of providing directionality of the magnetic field at a multi-angle orientation.

Hereinafter, various examples in the present disclosure capable of providing a wider recognition region by forming various magnetic field directionality will be described.

Figure 9:
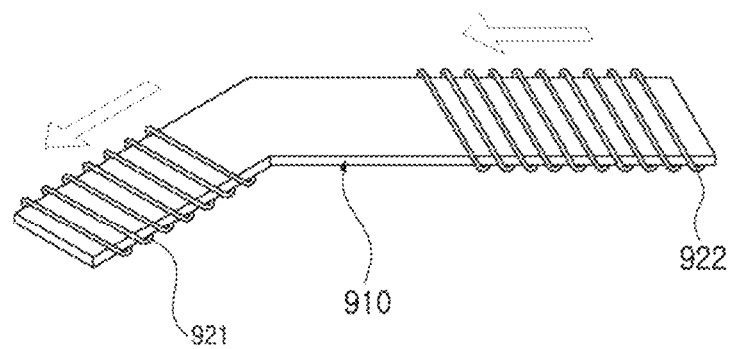
FIG. 9 is a perspective view illustrating an example of a solenoid-type coil module in the present disclosure.

FIG. 9 is a perspective view illustrating a solenoid-type coil module according to an example in the present disclosure.

Referring to FIG. 9, FIG. 9 illustrates a coil module having multiple magnetic field directionalities using a magnetic body 910 that is non-linearly formed, that is, having an asymmetric shape.

As illustrated, the coil module includes a magnetic body 910 that is non-linearly formed with coils, which are wound therearound. In the illustrated example, the coils include a first coil 921 wound around a first body portion 1011 and a second coil 922 wound around a second body portion 1012.

The first coil 921 and the second coil 922 are electrically connected to each other.

One end of the first coil 921 is connected to one end of the second coil 922 in series. The other end of the first coil 921 and the other end of the second coil 922 are each connected to terminals of an input of the wireless communications unit 120 (FIG. 4).

As another example, the first coil 921 is connected to the second coil 922 in parallel. In a case in which the first coil 921 and the second coil 922 are connected in parallel with each other, magnetic fields having different directivities are concurrently formed by controlling the first coil 921 and the second coil 922 to operate together.

As illustrated, since a winding axis of the first coil 921 and a winding axis of the second coil 922 are different from each other, the magnetic fields formed by the respective coils have different directivities. Concurrently, an overall magnetic field, formed by the first coil and second coil which are wound to be spaced apart from each other and are connected in series with each other, is formed by the magnetic fields formed in the respective coils which affect each other. As a result, the overall magnetic field will have various magnetic field directivities that coexist therein.

As a result, the coil module according to the present disclosure form a magnetic field having a plurality of directivities. Therefore, even in a case in which the magnetic head of the magnetic card reader has a specific directionality, the coil module is more effectively magnetically coupled with the magnetic head.

Figure 10:
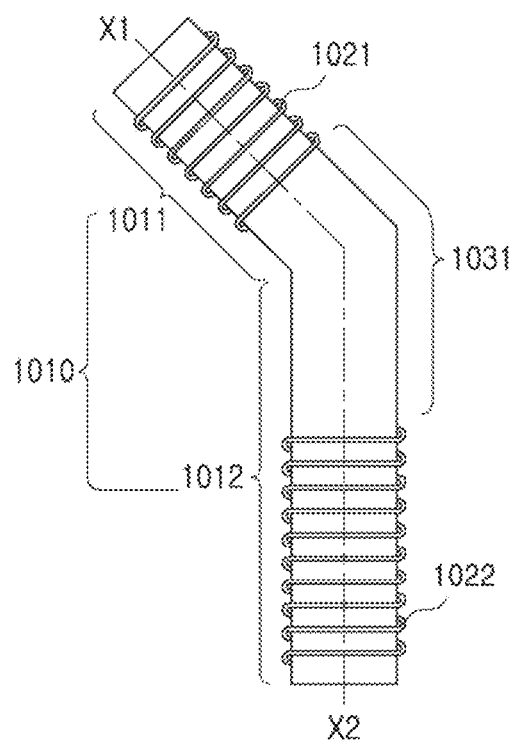
FIG. 10 is a plan view of the coil module illustrated in FIG. 9.

FIG. 10 is a plan view of the coil module illustrated in FIG. 9. A detailed description will be provided with reference to FIG. 10.

Referring to FIG. 10, a magnetic body 1010 includes a first body portion 1011 having a first axis X1 as a lengthwise direction (i.e., extended in a direction of the first axis), and a second body portion 1012 having a second axis X2 which is different from the first axis as the lengthwise direction (i.e., extended in a direction of the second axis X2). The second body portion 1012 is extended from one end of the first body portion 1011. The first axis X1 and the second axis X2 form a predetermined angle.

According to an example, the first body portion 1011 and the second body portion 1012 have different lengths. Since a range or directionality of the magnetic field formed by the coil module 110 differs based on a change in lengths of the first body portion 1011 and the second body portion 1012, the lengths of the first body portion 1011 and the second body portion 1012 may be adjusted and determined for an optimal design in an environment to which the coil module is applied, such as the mobile terminal, or the like.

A first coil 1021 is wound around the first body portion 1011, and a second coil 1022 is wound around the second body portion 1012. A winding angle of the first coil 1021 with respect to the first axis X1 corresponds to a winding angle of the second coil 1022 with respect to the second axis X2.

As an example, the first and second coils are wound to be separated from each other so that a spaced region 1031 is present between the first coil 1021 and the second coil 1022.

The first coil 1021 and the second coil 1022 are electrically connected to each other, and may be simultaneously operated to form one magnetic field.

As such, since the magnetic fields formed by the coil wound around the first body portion 1011 and the coil wound around the second body portion 1012 have at least two different directivities, i.e., directivities of the direction of the first axis and the direction of the second axis, which coexist with each other, the recognition region is more widely formed.

That is, the magnetic body 1010 of the illustrated coil module has an asymmetrical shape having at least one joint, and consequently, the magnetic fields generated by the coils 1021 and 1022 wound around such a magnetic body 1010 will also have the asymmetrical shape and various directivities.

Figure 11A:
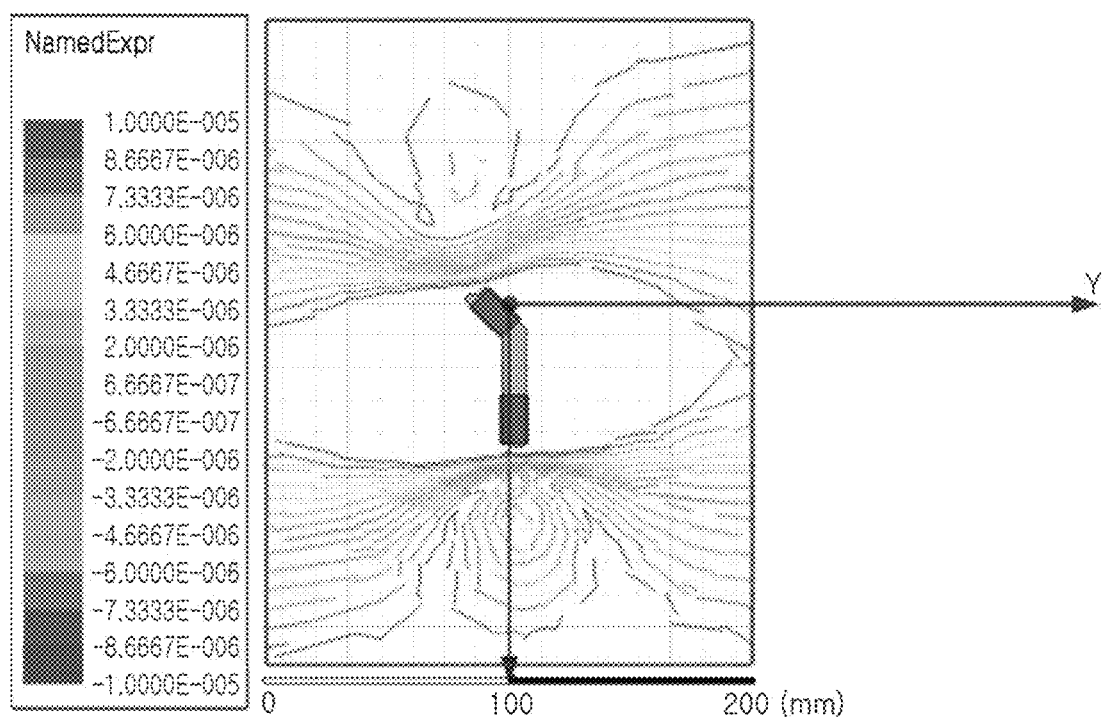
FIGS. 11A and 11B are graphs illustrating a recognition range of the coil module illustrated in FIG. 9.
Figure 11B:
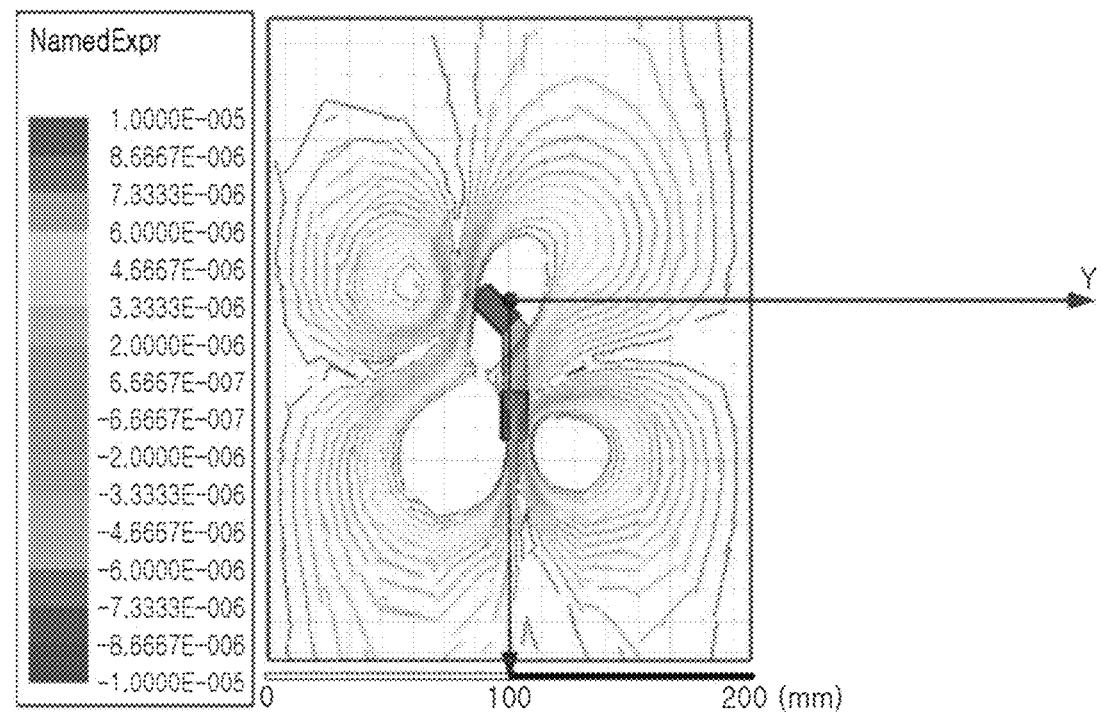

FIGS. 11A and 11B are graphs illustrating a recognition range of the coil module illustrated in FIG. 9, and illustrate that the magnetic field of the coil module 110 has an asymmetrical recognition range.

FIG. 11A illustrates a recognizable region of a case in which the magnetic head of the magnetic reader is put in a vertical direction (i.e., a direction which is parallel to the second body portion 1012), and FIG. 11B illustrates a recognizable region of a case in which the magnetic head of the magnetic reader is put in a horizontal direction (i.e., a direction which is perpendicular to the second body portion 1012).

As illustrated, it is seen that the magnetic field generated by the coil module has horizontal direction characteristics as well as vertical direction characteristics which are enhanced in at least some regions. Accordingly, it is seen that FIG. 11B has a wider recognizable region than a general solenoid coil.

Hereinabove, the example of adding characteristics for directionality of the magnetic field using the magnetic body having one joint has been illustrated with reference to FIGS. 9 and 10.

Hereinafter, various examples capable of adding characteristics for directionality of the magnetic field will be described with reference to FIGS. 12 through 21.

Figure 12:
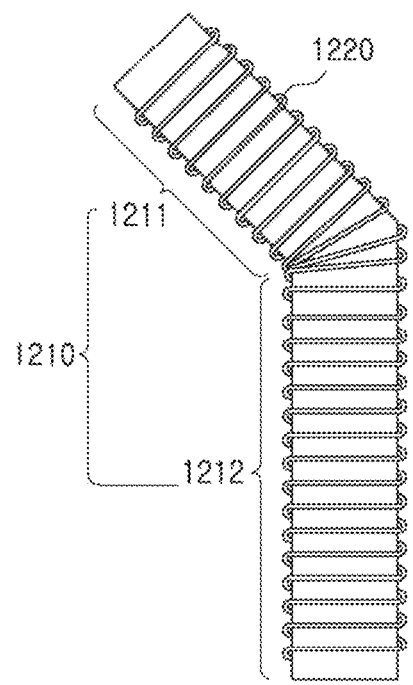
FIGS. 12 through 21 are views illustrating various examples of the solenoid-type coil module in the present disclosure.

FIG. 12 is a plan view illustrating a coil module according to another example in the present disclosure.

Referring to FIG. 12, the coil module includes a magnetic body 1210 of a bent shape having a joint, and a coil 1220 which is wound around the overall region of the magnetic body. As described above, the magnetic body 1210 has a first body portion 1211 having a first axis as a lengthwise direction, and a second body portion 1212 having a second axis different from the first axis in the lengthwise direction.

That is, the example illustrated in FIG. 12 discloses a coil which is wound around the overall region of the magnetic body, as one overall coil.

Such a coil is different from the example of FIG. 9 in the wound region of the coil, but such a wound region may be variously modified.

Figure 13:
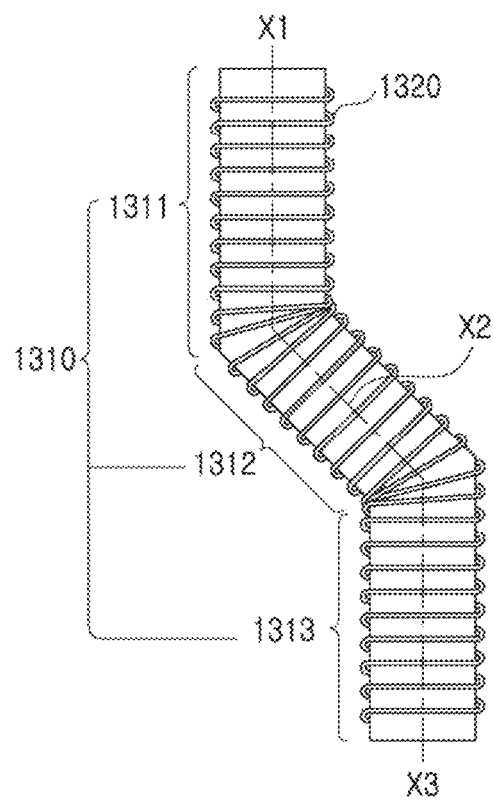

FIG. 13 is a plan view illustrating a coil module according to another example in the present disclosure.

Referring to FIG. 13, the coil module includes a magnetic body 1310 of a bent shape having two joints, and a coil 1320 which is wound around the magnetic body 1310.

That is, the magnetic body 1310 includes a first body portion 1311, a second body portion 1312 that forms a predetermined angle with the first body portion, and a third body portion 1313 that forms a predetermined angle with the second body portion. The third body portion 1313 has a third axis X3 which is different from the second axis X2. The second axis X2 and the third axis X3 form a predetermined angle. In an illustrated example, the first body portion 1311 and the third body portion 1313 are illustrated to be parallel and offset to each other, but this is merely illustrative and may be variously modified.

That is, some of the coils which are wound around the first body portion 1311 and third body portion 1313 form magnetic force having vertical directionality, and some of the coil which is wound around the second body portion 1312 form magnetic force having diagonal directionality, and an overall magnetic field is formed by summing the above-mentioned magnetic forces.

In an illustrated example, the coil 1320 is wound as one coil, but may be a coil which is separated into two or more and is wound according to other examples.

Figure 14:
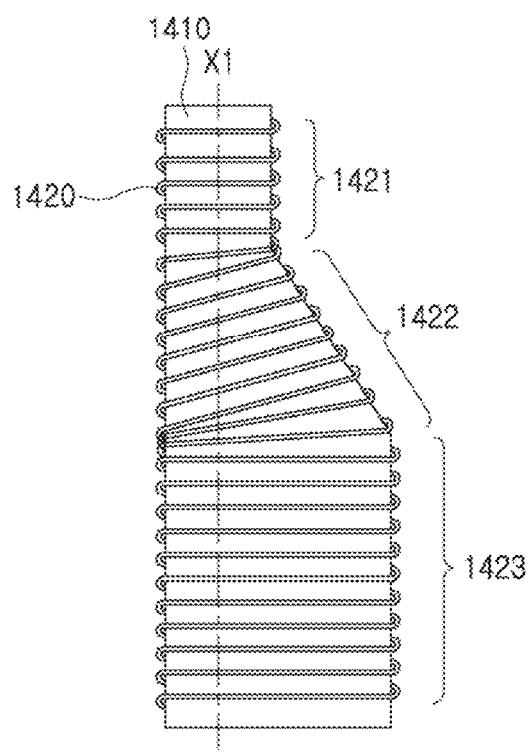

FIG. 14 is a plan view illustrating a coil module according to another example in the present disclosure.

Referring to FIG. 14, the coil module includes a magnetic body 1410 of an asymmetrical shape, and a coil 1420 which is wound around the magnetic body 1410.

The magnetic body 1410 has an asymmetrical shape. In an illustrated example, the magnetic body 1410 includes a first body portion 1421 extended in a direction of a first axis X1 and having a rectangular shape, a second body portion 1422 having an asymmetrical trapezoidal shape, and a third body portion 1423 extended in the direction of the first axis X1 and with a rectangular shape. However, this is merely illustrative, and various asymmetrical shapes may be applied to the magnetic body 1410.

A first coil is wound around at least a portion of the first body portion 1421, and a second coil is wound around at least a portion of the second body portion 1422. A third coil is wound around at least a portion of the third body portion 1423. In an illustrated example, the first coil to third coil are connected in series with each other.

As illustrated, a winding angle of the first coil with respect to the first axis X1 is different from the winding angle of the second coil with respect to the first axis X1. In addition, the winding angle of the second coil with respect to the first axis X1 is different from the winding angle of the third coil with respect to the first axis X1.

One of the reasons is because the second body portion 1422 includes a diagonal-shaped surface, and the second coil wound around the second body portion 1422 is wound in a diagonal direction.

As a result, magnetic force generated by the second coil wound around the second body portion 1422 has directionality in the diagonal direction, and has directionality different from magnetic forces generated by the first coil wound around the first body portion 1421 and the third coil wound around the third body portion 1423. Therefore, the overall magnetic field formed by such first to third coils has various directivities.

Figure 15:
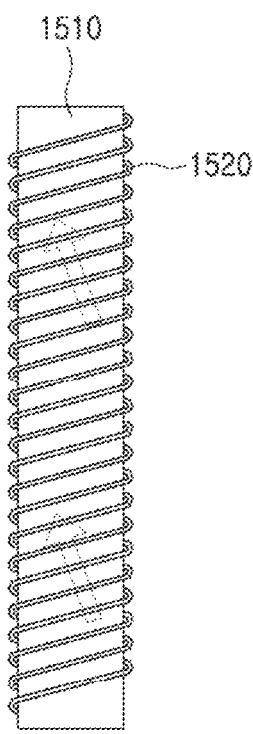

FIG. 15 is a plan view illustrating a coil module according to another example in the present disclosure. FIG. 15 illustrates an example of setting the directionality of the magnetic field using a coil which is wound in a diagonal shape.

As illustrated in FIG. 15, a magnetic body 1510 has a linear bar shape with a coil 1520 wound around it.

In accordance with Ampere's right-hand screw rule, in a case in which a coil is wound while forming a loop, as current flows in a form of such a loop, magnetic force is generated in a direction which is perpendicular to the flow of the current. That is, magnetic force of a diagonal shape is generated for each loop of each coil as in an illustrated arrow, and these magnetic forces influence each other to form the magnetic field having directionality of the diagonal direction.

That is, it is seen from the present example that the directionality of the magnetic field is formed by the winding shape of the coil regardless of a shape of the magnetic body 1510.

Figure 16:
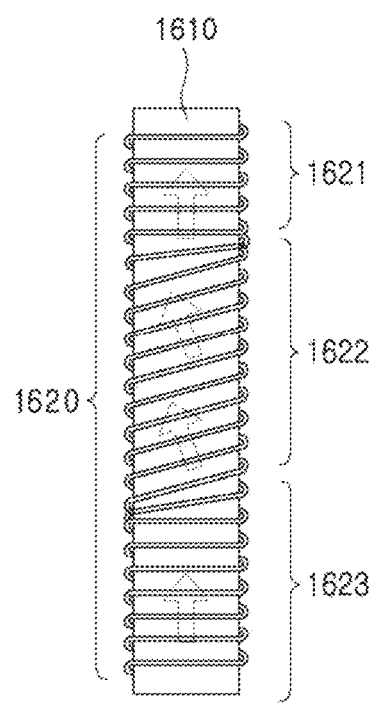

FIG. 16 is a plan view illustrating a coil module according to another example in the present disclosure. FIG. 16 illustrates an example of setting directionality of the magnetic field by changing the winding direction of the coil.

As illustrated in FIG. 16, a magnetic body 1610 is extended in a direction of a first axis to have a linear bar shape. A coil 1620 is wound around such a magnetic body 1610.

The coil 1620 includes a first coil 1621 wound around a portion of the magnetic body 1610 and a second coil 1622 wound around the other portion of the magnetic body 1610. According to an example, the coil 1620 further includes a third coil 1623 wound around another portion of the magnetic body 1610.

The first coil 1621 is wound at a first angle with respect to an axial direction of the magnetic body 1610, that is, a first axis. The second coil 1622 is wound at a second angle which is different from the first angle with respect to the first axis. The third coil 1623 is wound at a third angle which is different from the second angle with respect to the first axis.

That is, the coil 1620 includes the first coil 1621 that is horizontally wound in some regions of the magnetic body, and the second coil 1622 that is diagonally wound in some regions of the magnetic body.

In the illustrated example, magnetic force having vertical directionality are generated by the first and third coils 1621 and 1623. Magnetic forces having diagonal directionality are generated by the second coil 1622 which is diagonally wound. These magnetic forces influences each other to form a magnetic field in which the vertical directionality and the diagonal directionality coexist. Since the illustrated example is merely illustrative, a wound direction of the coil may be variously modified according to an example.

Figure 17:
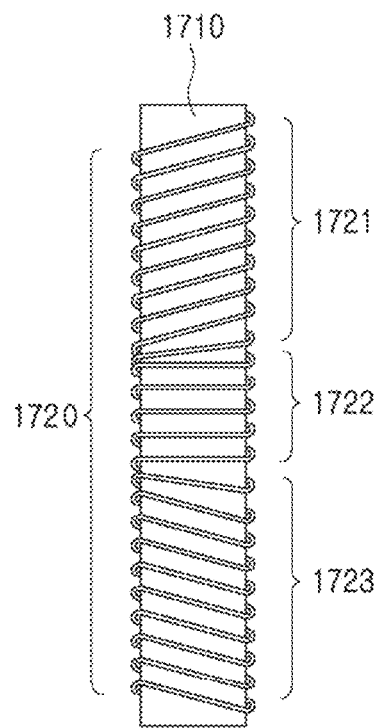

FIG. 17 is a plan view illustrating a coil module according to another example in the present disclosure.

As illustrated in FIG. 17, a magnetic body 1710 has a linear bar shape and a coil 1720 wound around the magnetic body 1710.

The coil 1720 includes a first coil 1721 wound in a first diagonal direction in some regions of the magnetic body, a second coil 1722 horizontally wound in an intermediate region of the magnetic body, and a third coil 1723 wound in a second diagonal direction different from the first diagonal direction in another region of the magnetic body.

In the illustrated example, magnetic force having vertical directionality is generated by the second coil 1722 which is horizontally wound. Magnetic force having diagonal directionality perpendicular to a first diagonal direction is generated by the first coil 1721 which is wound in the first diagonal direction. Magnetic force having diagonal directionality which is perpendicular to a second diagonal direction is generated by the third coil 1723 which is wound in the second diagonal direction. These magnetic forces influence each other to form the magnetic field, an overall magnetic field, in which the vertical directionality and the diagonal directionality which is different from the vertical directionality coexist. Since the illustrated example is merely illustrative, various winding directions can be implemented based on the disclosed example.

While FIGS. 12 through 17 illustrate examples in which a coil is continuously wound, according to other examples, the coil is separated into a plurality of coils which are electrically connected to each other. Hereinafter, such examples will be described with reference to FIGS. 18 through 21.

Figure 18:
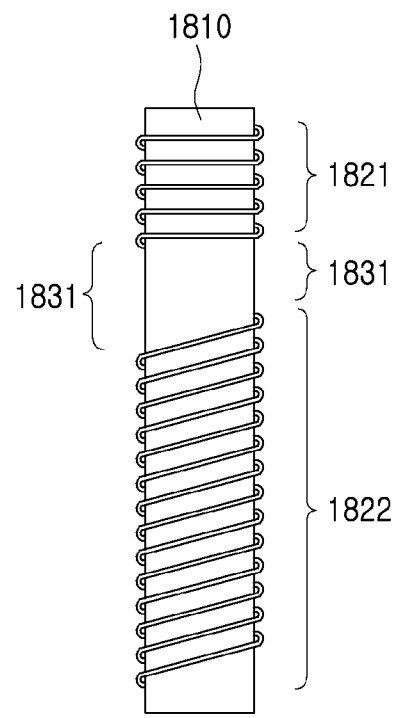

FIG. 18 is a plan view illustrating a coil module according to another example in the present disclosure.

Referring to FIG. 18, a coil module includes a magnetic body 1810 of a linear bar shape which is extended in a direction of a first axis. A first coil 1821 and a second coil 1822 are wound around the magnetic body 1810.

The first coil 1821 and the second coil 1822 are electrically connected to each other. For example, the first coil 1821 and the second coil 1822 are connected in series with or in parallel to each other. The first coil 1821 and the second coil 1822 are simultaneously operated to form one magnetic field.

In an illustrated example, since the first coil 1821 is wound at a first angle (i.e., horizontally in an illustrated example) with respect to the first axis, and the second coil 1822 is wound at a second angle (i.e., diagonally in an illustrated example) which is different from the first angle with respect to the first axis, magnetic force in a vertical direction is generated by the first coil 1821 and magnetic force in a diagonal direction is generated by the second coil 1822, similarly to the magnetic fields described above.

The first coil 1821 and the second coil 1822 are separated by a spaced region 1831. Depending upon the size or position of such a spaced region, the interaction between the magnetic forces generated by the respective coils may be adjusted, and the recognition range may be adjusted accordingly.

The number of coils, the winding direction of the coil, the position of the spaced region, or the number of spaced regions may be variously modified. Hereinafter, modified examples will be described with reference to FIGS. 19 through 21.

Figure 19:
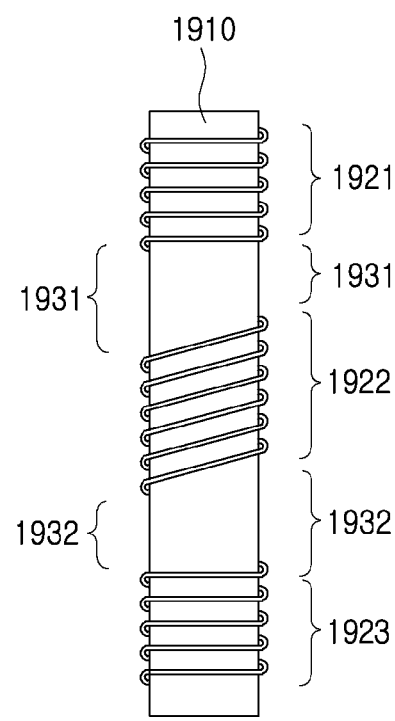

FIG. 19 is a plan view illustrating a coil module according to another example in the present disclosure.

Referring to FIG. 19, a coil module includes a magnetic body 1910 of a linear bar shape, and a first coil 1921, a second coil 1922, and a third coil 1923 which are wound around the magnetic body 1910.

The first coil 1921 to the third coil 1923 are electrically connected to each other. The first coil 1921 to the third coil 1923 are simultaneously operated to form one magnetic field.

In the illustrated example, since the first coil 1921 and the third coil 1923 are horizontally wound around the magnetic body 1910, and the second coil 1922 is diagonally wound around the magnetic body 1910, magnetic force in a vertical direction is generated by the first coil 1921 and the third coil 1923, and magnetic force in a diagonal direction is generated by the second coil 1922, similarly to those described above.

The first coil 1921 and the second coil 1922 are separated from each other by a first spaced region 1931, and the second coil 1922 and the third coil 1923 are separated from each other by a second spaced region 1932.

Figure 20:
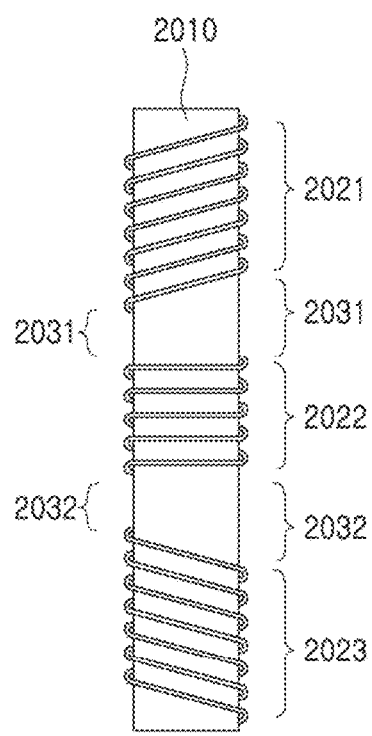

FIG. 20 is a plan view illustrating a coil module according to another example in the present disclosure.

Referring to FIG. 20, a coil module includes a magnetic body 2010 of a linear bar shape, and a first coil 2021, a second coil 2022, and a third coil 2023 which are wound around the magnetic body 2010.

The first coil 2021 to the third coil 2023 are electrically connected to each other and simultaneously operated to form one magnetic field.

In the illustrated example, the first coil 2021 is wound in a first diagonal direction, the second coil 2022 is horizontally wound, and the third coil 2023 is wound in a second diagonal direction. Therefore, magnetic force in a diagonal direction perpendicular to the first diagonal direction is generated by the first coil 2021. Magnetic force in a vertical direction is generated by the second coil 2022, and magnetic force in the diagonal direction perpendicular to the second diagonal direction is generated by the third coil 2023, similarly to those described above.

The first coil 2021 and the second coil 2022 are separated from each other by a first spaced region 2031, and the second coil 2022 and the third coil 2023 are separated from each other by a second spaced region 2032.

In the examples described above, the magnetic body includes one body, but may include a plurality of separated bodies according to an example.

Figure 21:
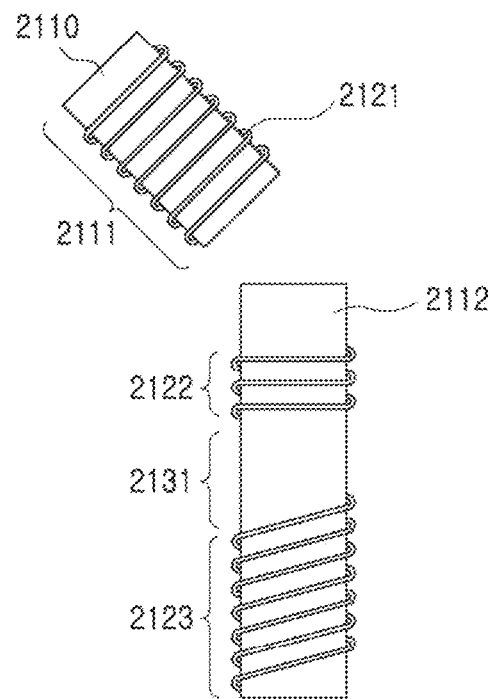

FIG. 21 is a plan view illustrating a coil module according to another example in the present disclosure, and illustrates the coil module using a magnetic body having two separated bodies.

Referring to FIG. 21, a magnetic body 2110 includes a first body portion 2111 and a second body portion 2112. The first body portion 2111 is extended in a direction of a first axis, and the second body portion 2112 is extended in a direction of a second axis, different from the first axis. The first body portion 2111 and the second body portion 2112 are bodies which are separated from and spaced apart from each other.

A coil is wound around each of the first body portion 2111 and the second body portion 2112.

As an example, a first coil 2121 is wound around the first body portion 2111, and a second coil 2122 is wound around the second body portion 2112.

The first body portion 2111 is extended in a diagonal direction, and the first coil 2121 is wound around a center axis of the first body portion 2111 at a predetermined angle.

The second body portion 2112 is extended in a vertical direction, and the second coil 2122 is wound around a center axis of the second body portion 2112 at a predetermined angle (i.e., a horizontal direction in an illustrated example).

The first coil 2121 generates magnetic force having a diagonal directionality, and the second coil 2122 generates magnetic force having a vertical directionality.

Therefore, in a case in which the first coil 2121 and the second coil 2122 are connected in series with each other and are simultaneously operated, the magnetic force generated by the first coil 2121 and the magnetic force generated by the second coil 2122 influence each other to form the magnetic field having various directivities.

As another example, the first coil 2121 is wound around the first body portion 2111, and a second coil 2122 and the third coil 2123 are wound around the second body portion 2112. The second coil 2122 and the third coil 2123 are separated from each other by a spaced apart region 2131.

The first body portion 2111 is extended in a diagonal direction, and the first coil 2121 is wound around a center axis of the first body portion 2111 at a predetermined angle.

The second body portion 2112 is extended in a vertical direction, the second coil 2122 is wound around the center axis of the second body portion 2112 at the predetermined angle (i.e., the horizontal direction in an illustrated example). The third coil 2123 is wound around the center axis of the second body portion 2112 at a second angle (i.e., the diagonal direction in an illustrated example) which is different from the first angle.

The first coil 2121 generates magnetic force having a diagonal directionality, the second coil 2122 generates magnetic force having a vertical directionality, and the third coil 2123 generates magnetic force having another diagonal directionality direction.

Therefore, an overall magnetic field of the coil module which is generated by the first coil 2121 to third coil 2123 will have various directivities, and the recognizable region of the magnetic head is increased accordingly.

As another example, the first coil 2121 is wound around the first body portion 2111, and the third coil 2123 is wound around the second body portion 2112.

The first body portion 2111 is extended in the diagonal direction, and the first coil 2121 is wound around a first axis, which is a center axis of the first body portion 2111, at a predetermined angle.

The second body portion 2112 is extended in the vertical direction, and the third coil 2123 is wound around a second axis, which is a center axis of the second body portion 2112, at a predetermined angle.

That is, when a difference between the first axis and the second axis is a first angle, and a difference between a winding angle of the first coil 2121 with respect to the first axis and a winding angle of the third coil 2123 with respect to the second axis is a second angle, the first angle and the second angle are different from each other.

Therefore, an overall magnetic field of the coil module which is generated by the first coil 2121 and third coil 2123 will have various directivities, and the recognizable region of the magnetic head is increased accordingly.

Hereinabove, the description has been provided based on the coil module of the wound solenoid type. However, this is merely illustrative, and the coil module according to an example may be a solenoid type formed in a multilayer substrate. Hereinafter, a more detailed description will be provided reference to FIGS. 22 to 25.

Figure 22:
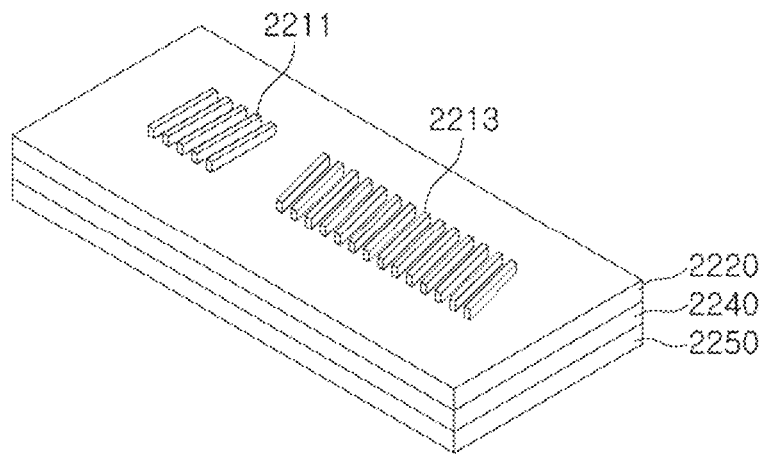
FIGS. 22 through 25 are views illustrating various examples of a solenoid-type coil module formed in a multilayer substrate in the present disclosure.
Figure 24:
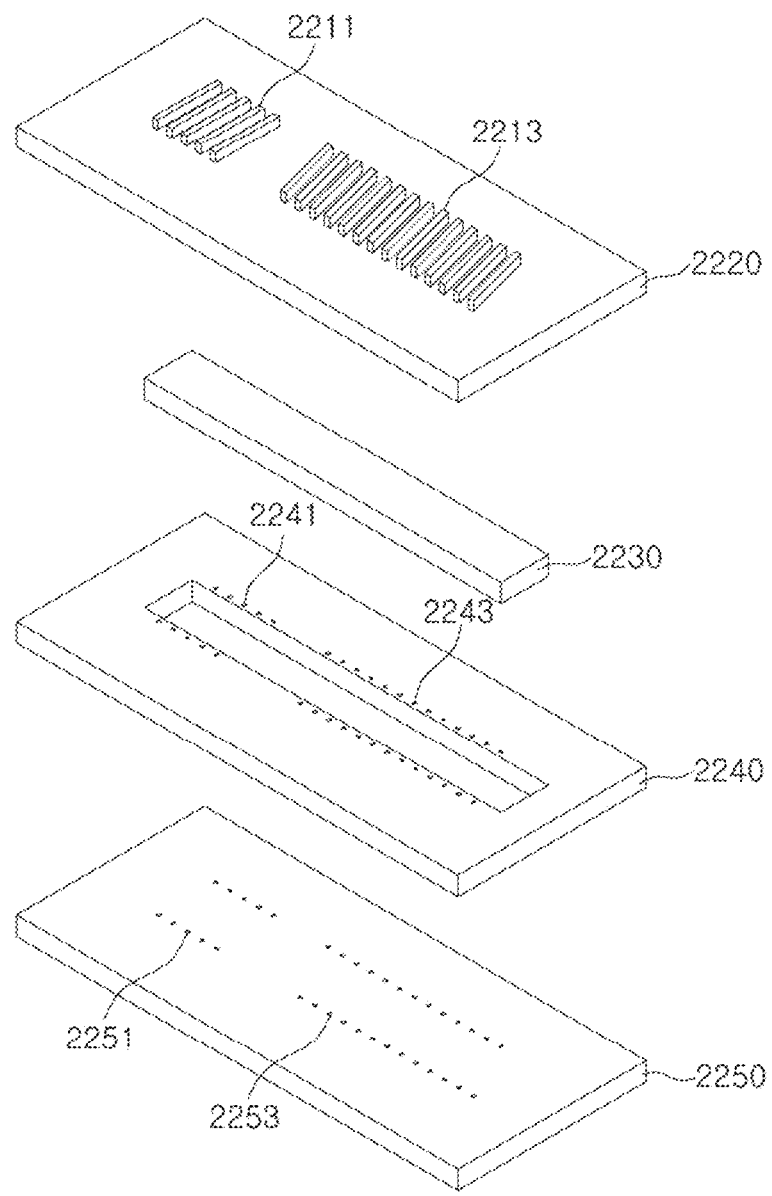

FIG. 22 is a perspective view illustrating a solenoid-type coil module formed in a multilayer substrate according to an example in the present disclosure, and FIG. 24 is an exploded perspective view of FIG. 22.

Examples illustrated in FIGS. 22 and 24 relate to examples including a first coil and a second coil which are wound around a magnetic body extended in a first axis, at different angles.

Referring to FIGS. 22 and 24, the coil module includes a first substrate 2220 formed on a top surface of a magnetic body 2230, and a second substrate 2250 formed on a bottom surface of the magnetic body 2230, based on the magnetic body 2230.

A fixing substrate 2240 that surrounds the magnetic body 2230 is formed around the magnetic body 2230.

A first conductive pattern 2211, which is a portion of the first coil, and a second conductive pattern 2213, which is a portion of the second coil, are formed on a top surface of the first substrate 2220. In one example, the first substrate 2220 is a polyimide (PI) substrate, and a conductive layer is formed on one surface (i.e., a top surface in an illustrated example) of the first substrate. By performing a deposition operation and an etching operation for the conductive layer, the first conductive pattern 2211 and the second conductive pattern 2213 are formed as described above.

Although not illustrated, a third conductive pattern, which is a portion of the first coil, and a fourth conductive pattern, which is a portion of the second coil, are also formed on a bottom surface of the second substrate 2250. For example, the second substrate 2250 may be a polyimide (PI) substrate, and a conductive layer may be formed on one surface (i.e., the bottom surface in an illustrated example) of the second substrate. By performing a deposition operation and an etching operation for the conductive layer, the third conductive pattern and the fourth conductive pattern may be formed.

A plurality of via holes 2241 and 2243 are formed in positions of the fixing substrate 2240 corresponding to both ends of the first conductive pattern 2211 and the second conductive pattern 2213.

Similarly, a plurality of via holes 2251 and 2253 are also formed in positions of the second substrate 2250 corresponding to both ends of the first conductive pattern 2211 and the second conductive pattern 2213. Although not illustrated, a plurality of via holes may also be formed in the first substrate 2220.

Therefore, the first conductive pattern 2211 formed on the top surface of the first substrate 2220, the via holes 2241 and 2251 formed in the first substrate 2220, the fixing substrate 2240, and the second substrate 2250, and the third conductive pattern formed on the bottom surface of the second substrate 2250 are electrically connected to each other to form a first coil wound around the magnetic body 2230.

In addition, the second conductive pattern 2213 formed on the top surface of the first substrate 2220, the via holes 2243 and 2253 formed in the first substrate 2220, the fixing substrate 2240, and the second substrate 2250, and the fourth conductive pattern formed on the bottom surface of the second substrate 2250 may be electrically connected to each other to form a second coil wound around the magnetic body 2230.

Figure 23:
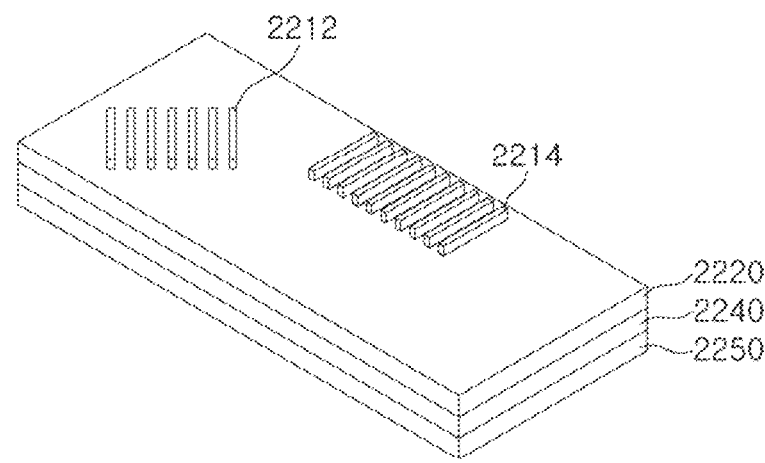
Figure 25:
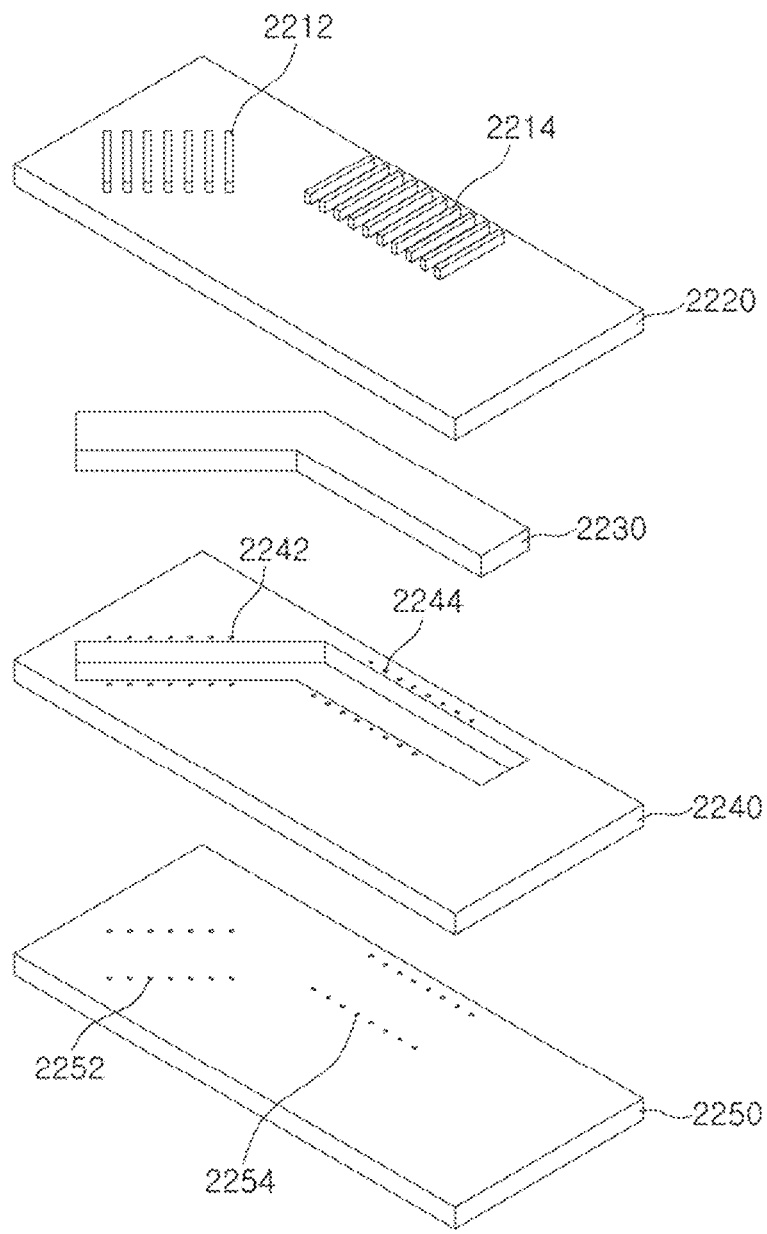

FIG. 23 is a perspective view illustrating a solenoid-type coil module formed in a multilayer substrate according to an example in the present disclosure, and FIG. 25 is an exploded perspective view of FIG. 23.

Examples illustrated in FIGS. 23 and 25 relate to examples including a first coil and a second coil which are each wound around the magnetic body which is extended in two different axes.

Referring to FIGS. 23 and 25, the magnetic body 2230 includes a first body portion which is extended in a direction of a first axis, and a second body portion which is extended in a second axis, different from the first axis.

A first conductive pattern 2212, which is a portion of the first coil, and a second conductive pattern 2214, which is a portion of the second coil, may be formed on the top surface of the first substrate 2220. Although not illustrated, a third conductive pattern, which is a portion of the first coil, and a fourth conductive pattern, which is a portion of the second coil, may also be formed on a bottom surface of the second substrate 2250.

A plurality of via holes 2242 and 2244 is formed in positions of the fixing substrate 2240 corresponding to both ends of the first conductive pattern 2212 and the second conductive pattern 2214, a plurality of via holes is also formed in positions of the first substrate 2220 corresponding to the plurality of via holes 2242 and 2244. A plurality of via holes 2252 and 2254 is also formed in positions of the second substrate 2250 corresponding to the plurality of via holes 2242 and 2244. It is understood that the first coil and the second coil may be formed through the above-mentioned conductive patterns and via holes.

Since the examples illustrated in FIGS. 22 through 25 are illustrative descriptions of the coil module formed in the multilayer substrate, it may be apparent that the examples illustrated in FIGS. 9 through 21, and various modified examples of the coil module obtained by combining the examples in addition to the illustrated examples may be formed in the multilayer substrate.

Hereinabove, various example of the coil module have been described with reference to FIGS. 9 through 25. Since the examples illustrated in FIGS. 9 through 25 are illustrative, it will be understood by those skilled in the art that various modifications may be made from the descriptions above.

Figure 26:
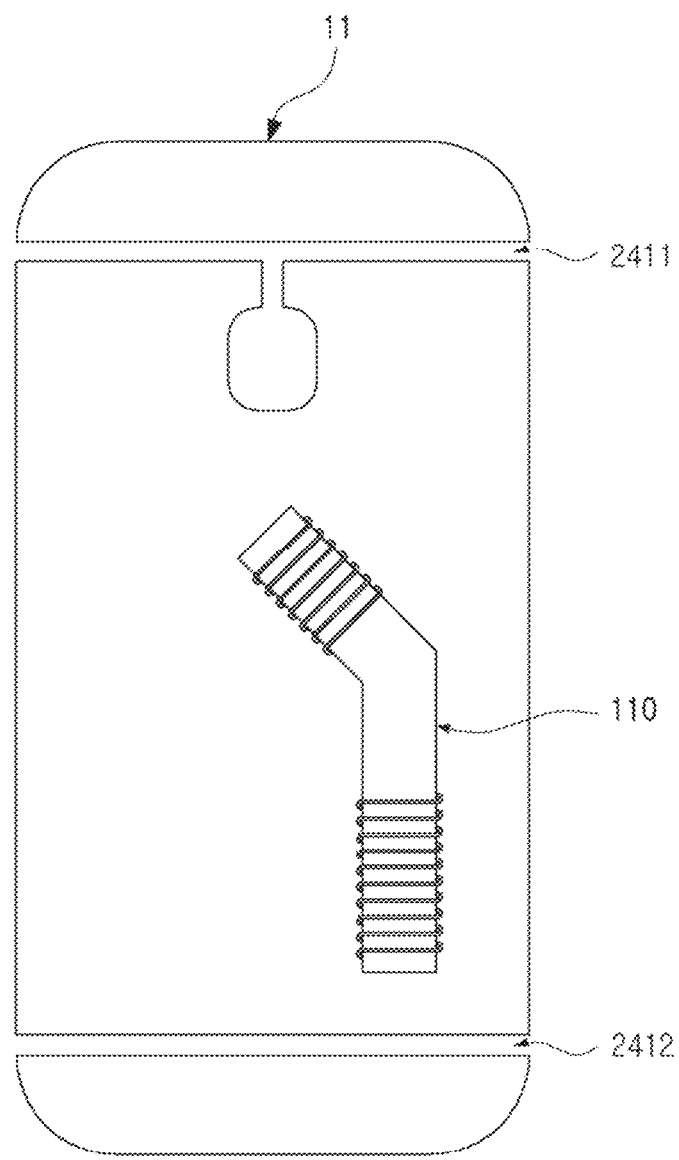
FIGS. 26 through 28 are views illustrating various examples of a case of a mobile terminal and a coil module applied thereto.
Figure 27:
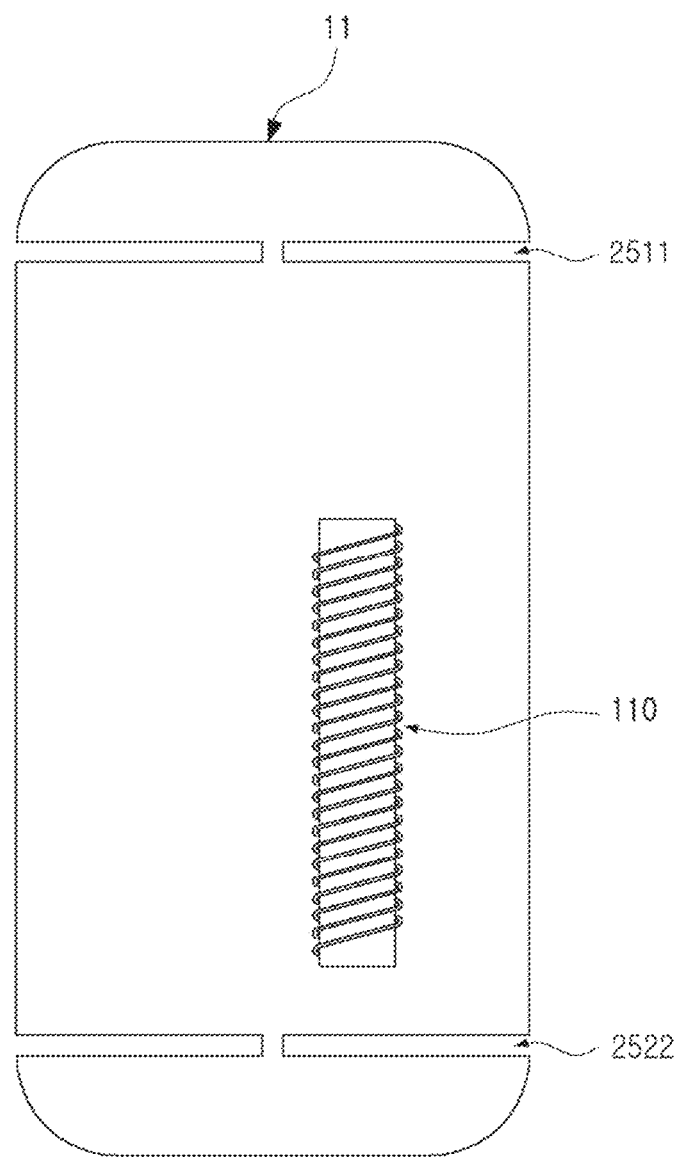
Figure 28:
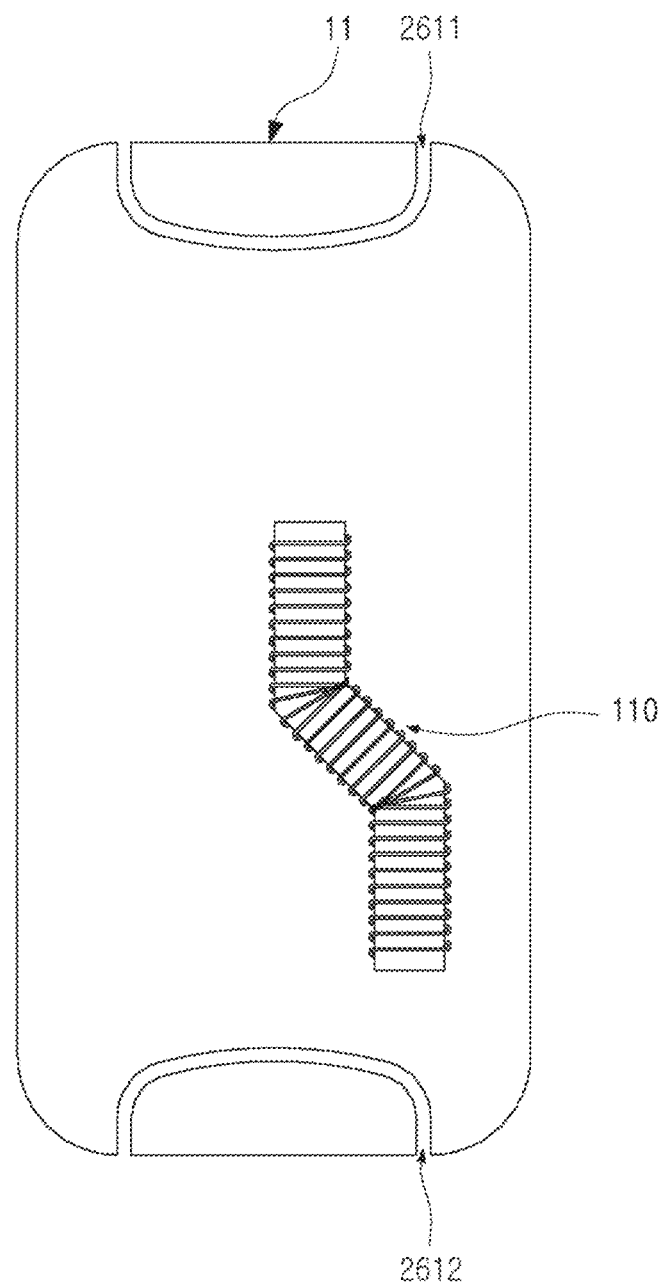

FIGS. 26 through 28 are views illustrating various examples of a case of a mobile terminal and a coil module applied thereto.

FIG. 26 is a view illustrating a mobile terminal according to an example in the present disclosure to which the coil module described above is applied.

Referring to FIG. 26, the mobile terminal includes a case 11, and a coil module 110 included in the case 11.

The coil module 110 is the solenoid coil capable of forming the magnetic field having various directivities, as described above in FIGS. 9 through 21. FIG. 26 illustrates the solenoid coil having a joint, but other solenoid coils may be applicable.

The case 11 may be formed of a metal material.

In a case of the spiral coil, which is a comparative example, since a formation direction of the magnetic field is perpendicular to the metal case 11, the magnetic field may become weak due to the metal case 11, but since the solenoid-type coil module according to the present disclosure forms a magnetic field having a component parallel to the metal case 11, the magnetic field is stably formed even when the case 11 is formed of a metal.

In addition, slits 2411 and 2412 are formed in the case 11 to be spaced apart from each other in a longitudinal direction of the case 11, and the slits of the case 11 may be filled with a non-metal material. Therefore, the slits 2411 and 2412 make it easier for the magnetic field by the coil module 110 to be formed outside the case 11 formed of the metal material of the mobile terminal.

In the illustrated example, the slits are formed as a T-shaped slit 2411 and a linear-shaped slit 2412, but the shapes of the slits may be variously modified.

FIG. 27 is a view illustrating a mobile terminal according to an example in the present disclosure to which the coil module described above is applied.

Referring to FIG. 27, the mobile terminal includes the case 11, and the coil module 110 included in the case 11.

The coil module 110 is the solenoid coil capable of forming the magnetic field having various directivities, as described above in FIGS. 9 through 21. FIG. 27 illustrates the solenoid coil including the coil which is diagonally wound, but this is merely illustrative.

The case 11 may be formed of the metal material, and slits 2511 and 2522 may be formed in the case 11 to allow the coil module 110 to smoothly generate the magnetic field outside the case 11. As described above, the slits may be filled with the non-metal material.

FIG. 28 is a view illustrating a mobile terminal according to an example in the present disclosure to which the coil module described above is applied.

Referring to FIG. 28, the mobile terminal includes the case 11, and the coil module 110 included in the case 11.

The coil module 110 is the solenoid coil capable of forming the magnetic field having various directivities, as described above in FIGS. 9 through 21. FIG. 28 illustrates the solenoid coil having two joints, but this is merely illustrative.

The case 11 may be formed of the metal material, and a U-shaped slit 2611 and an n-shaped slit 2612 are formed in the case 11 to allow the coil module 110 to smoothly generate the magnetic field outside the case 11. As described above, the slits may be filled with the non-metal material.

In addition to the examples described with reference to FIGS. 26 through 28, various slits may be applicable to the case 11, and the position or size of the coil module 110 may also be differently applicable according to an example.

As described in FIGS. 26 through 28, it is seen that a slit is formed in each of the upper portion and lower portion of the case 11. In addition, in this case, the coil module 110 is positioned between the slit formed in the upper portion of the case and the slit formed in the lower portion of the case. One of the reasons is because a magnetic loop is formed through both ends of the coil module 110 and the slit formed in the upper portion of the case and the slit formed in the lower portion of the case are respectively present at both ends of the coil module 110, such that the magnetic loop is formed to have a more efficient and strong magnetic field outside the mobile terminal through the slits.

As set forth above, according to the examples in the present disclosure, the wireless coil module securely and reliably transmit data even in the environment in which the position or the angle of the receiving coil is changed.

While examples have been shown and described above, it will be apparent to those skilled in the art that modifications and variations could be made without departing from the scope of the present invention as defined by the appended claims.

What is claimed is:

1. A coil module, comprising:
   a magnetic body comprising a first body portion extending in a first axial direction and a second body portion extending in a second axial direction different from the first axial direction; and
   a transmitting coil structure comprising,
      a first coil wound around a portion of the first body portion, and
      a second coil wound around a portion of the second body portion,
   wherein the first body portion and the second body portion have different lengths, and
   a first winding angle of the first coil with respect to the first axial direction is different from a second winding angle of the second coil with respect to the second axial direction.

2. The coil module of claim 1, wherein the first coil is connected to the second coil in parallel, and
   the first coil is operated together with the second coil.

3. The coil module of claim 1, wherein the first body portion is separated from and spaced apart from the second body portion.

4. The coil module of claim 1, wherein a difference between the first axial direction and the second axial direction is a first angle,
   a difference between the first winding angle of the first coil with respect to the first axial direction and the second winding angle of the second coil with respect to the second axial direction is a second angle, and
   the first angle and the second angle are different from each other.

5. The coil module of claim 1, wherein the transmitting coil structure further comprises:
   a third coil wound around at least a portion of the second body portion; and
   the second winding angle of the second coil with respect to the second axial direction and a third winding angle of the third coil with respect to the second axial direction being different from each other.

6. The coil module of claim 1, wherein the magnetic body further comprises:
   a third body portion extending in a third axial direction different from either one or both of the first axial direction and the second axial direction; and
   the transmitting coil structure further comprises a third coil wound around a portion of the third body portion.

7. The coil module of claim 1, wherein the magnetic body further comprises:
   a third body portion extending in the first axial direction; and
   the transmitting coil structure further comprises a third coil wound around a portion of the third body portion.

8. A coil module, comprising:
   a magnetic body comprising a first body portion and a second body portion, the first body portion extending in a first axial direction and having a symmetrical polygonal shape, and the second body portion extending in a second axial direction and having an asymmetrical polygonal shape; and
   a transmitting coil structure including a first coil wound around at least a portion of the first body portion and a second coil wound around at least a portion of the second body portion, wherein the first body portion and the second body portion have different lengths, and a first winding angle of the first coil with respect to the first axial direction is different from a second winding angle of the second coil with respect to the second axial direction.

9. The coil module of claim 8, wherein the magnetic body further comprises:

a third body portion formed at one side of the second body portion and having the symmetrical polygonal shape, wherein the transmitting coil structure further comprises a third coil wound around a portion of the third body portion.

10. A coil module, comprising:

a magnetic body comprising a first body part extending in a first axial direction and a second body part extending in a second axial direction different from the first axial direction; and a transmitting coil structure comprising a first coil wound around the first body part of the magnetic body and a second coil wound around the second body part of the magnetic body, wherein the first coil is wound at a first angle with respect to the first axial direction, the second coil is wound at a second angle with respect to the second axial direction, the second angle being different from the first angle, and the first body part and the second body part have different lengths.

11. The coil module of claim 10, wherein the magnetic body further comprises a third body part extending in a third axial direction, and the transmitting coil structure further comprises a third coil wound around the third body part of the magnetic body at a third angle with respect to the third axial direction, the third angle different from the second angle.

12. The coil module of claim 10, wherein the first coil and the second coil are spaced apart from each other.

13. The coil module of claim 10, wherein the first body part has a symmetrical polygonal shape, and the second body part has an asymmetrical polygonal shape.

14. An information transmitter for transmitting data to magnetic card reader in a non-contact type, comprising:

a coil module comprising a magnetic body and a transmitting coil structure wound around the magnetic body; and a wireless communications unit configured to control the coil module to transmit the data to the magnetic card reader, wherein the magnetic body comprises a first body part extending in a first axial direction and a second body part extending in a second axial direction different from the first axial direction, the first body part and the second body part have different lengths, and the transmitting coil structure comprises a first coil wound at a first angle with respect to the first axial direction and a second coil wound at a second angle with respect to the first axial direction, the second angle being different to the first angle.

* * * * *